J. Mac Gregor Jr.
Coffee Pot.
No. 3,176. Reissued Oct. 27, 1868.
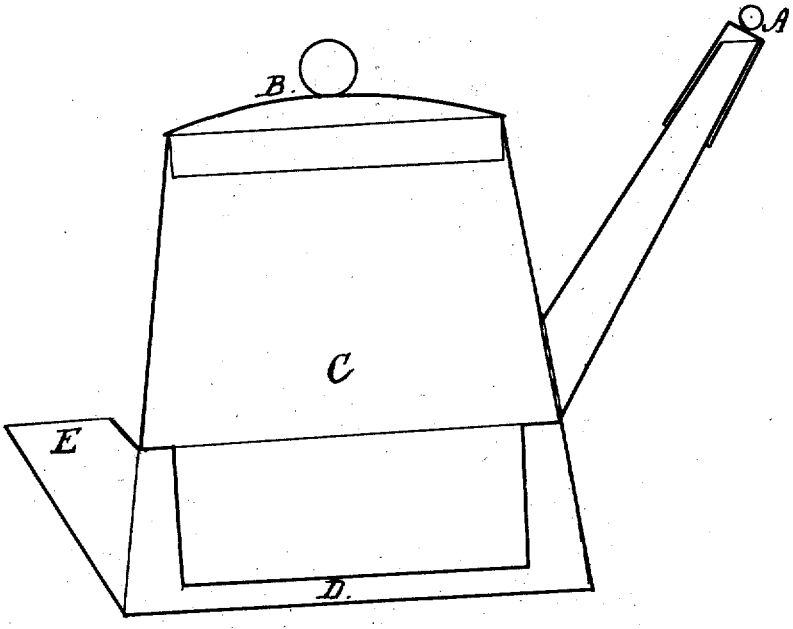
N. PETERS, PHOTO-LITHOGRAPHER, WASHINGTON, D. C.

United States Patent Office.

GEORGE R. CHITTENDEN, OF CHICAGO, ILLINOIS, AND CHARLES A. SMITH, OF MILWAUKEE, WISCONSIN, ASSIGNEES OF JAMES MACGREGOR, JUNR.

*Letters Patent No.* 10,752, *dated April* 11, 1854; *extended seven years; reissue No.* 3,176, *dated October* 27, 1868.

IMPROVEMENT IN COFFEE-POTS.

The Schedule referred to in these Letters Patent and making part of the same.

*To all whom it may concern:*

Be it known that JAMES MACGREGOR, Jr., of Troy city, county of Rensselaer, in the State of New York, has invented a new and useful Improvement in Tea and Coffee-Pots; and we do hereby declare that the following is a full, clear, and exact description thereof, which will enable those skilled in the art to make and use the same, reference being had to the accompanying drawing, forming part of this specification, in which—

Figure 1 is a vertical section.

Similar letters of reference indicate corresponding parts.

The object of this invention is to produce a tea and coffee-pot, in which tea and coffee can be made, without the loss of any portion of the aroma thereof.

A is the cover of the spout; B, the cover of the pot; C, the space for the tea and coffee; D, the space for the water; E is the mouth-piece for water and the exit of steam.

*Operation.*

When this institution is to be used, fill the space D with water, nearly full. Put such portion of tea or coffee in the space C as is wanted, with water, and cover up the spout with the cover A, and the main pot with the cover B, and set the pot on the fire or stove. The water will boil in the space D, but the tea or coffee will be kept just below the boiling-point, and no steam will be raised, consequently no aroma of the tea or coffee will be thrown off. The coffee will not be roiled, for the water in the coffee or tea remains tranquil.

What we claim as the invention, and desired to be secured by Letters Patent, is—

1. A tea or coffee-pot, when made with two receptacles, one for tea or coffee, and the other for water, substantially as described.

2. A tea or coffee-pot, so arranged that the heat shall be communicated to the tea or coffee through a water or liquid-medium, substantially as described.

In witness whereof, (JAMES MACGREGOR, Jr., being dead,) we, the present owners, sign our names.

GEO. R. CHITTENDEN,
CHAS. A. SMITH,

*Assignees of James Buell, executor of James MacGregor, Jr., and of J. B. Smith, assignee of James Buell, executor of James MacGregor, Jr.*

Witnesses:
E. C. PARTRIDGE,
H. S. LOOK.